SUPERREGENERATIVE RECEIVER

Filed April 13, 1944 2 Sheets-Sheet 1

INVENTOR
RICHARD C. EMERSON
BY George V. Elliott
AGENT

INVENTOR
RICHARD C. EMERSON
BY George V. Eltgroth
AGENT

Patented Dec. 26, 1950

2,535,401

UNITED STATES PATENT OFFICE 2,535,401

SUPERREGENERATIVE RECEIVER

Richard Carlisle Emerson, Glendale, Calif., assignor to Bendix Aviation Corporation, South Bend, Ind., a corporation of Delaware Application April 13, 1944, Serial No. 530,894

10 Claims. (Cl. 250—20)

This invention relates to superregenerative receivers and more particularly to a superregenerative receiver having improved sensitivity and diminished quench frequency output.

As is well known, remarkable sensitivity of response to radio frequency signals can be obtained from oscillator circuits in which oscillations are periodically caused to build up and die away, the frequency with which this occurs being commonly known as the quench frequency. Such circuits are generally known as superregenerative amplifiers and the variation in the envelope shape and build-up exponent of the intermittent oscillations caused by modulation of the incoming signal is employed to derive a current at the modulation frequency. The modulation currents are always mingled with a large quench frequency current component, and the elimination of this component presents great difficulty, especially when good response to modulation frequencies approaching the quench frequency is required. In the self-quenched type of oscillator, to which this invention is especially directed, the problem of quench frequency energy elimination is particularly complicated by the change in quench frequency with change in received signal strength, which change also occurs during the modulation cycle. The change is of a magnitude making the use of sharply tuned rejection filters impossible. The normally poor ratio of modulation current to quench frequency current is rendered more unfavorable in known self-quenching superregenerative receivers by the fact that signal or radio frequency voltages, quench frequency voltages, and modulation frequency voltages coexist on the detecting grid, one of which, the radio frequency voltage, has been found to produce detected anode current changes opposing those resulting from the remaining voltages. The modulation currents are thus the resultant of two opposing alternating current components, each of which is larger than the resultant.

Accordingly, it is a principal object of the invention to provide new and novel superregenerative receiving apparatus having improved output characteristics.

Another object of the invention is to provide new and novel superregenerative receiving apparatus having an improved ratio of modulation frequency energy to quench frequency energy in the output thereof.

Still another object of the invention is to provide new and novel superregenerative receiving apparatus in which, for a given signal input, larger output voltage is delivered from a given number of amplifying devices than in presently available receivers in which quench frequency and radio frequency voltages are simultaneously present upon the control element of the detecting device.

A further object of the invention is to provide new and novel superregenerative receiving apparatus in which the opposition of modulation current components in the detected current is prevented or eliminated.

The above objects and advantages of the invention are substantially accomplished by connecting an amplifier tube in feedback relationship to a tuned circuit, the grid of said tube being connected to said circuit by a capacitor, connecting said grid to ground through a radio frequency choke adjacent the grid in series with a parallel connected resistor and capacitor adjacent the ground, and impressing the voltages appearing across said resistor between the cathode and control grid of a detector amplifier tube.

Other objects and advantages of the invention will in part be disclosed and in part be obvious when the following specification is read in conjunction with the drawings in which.

Figure 1:
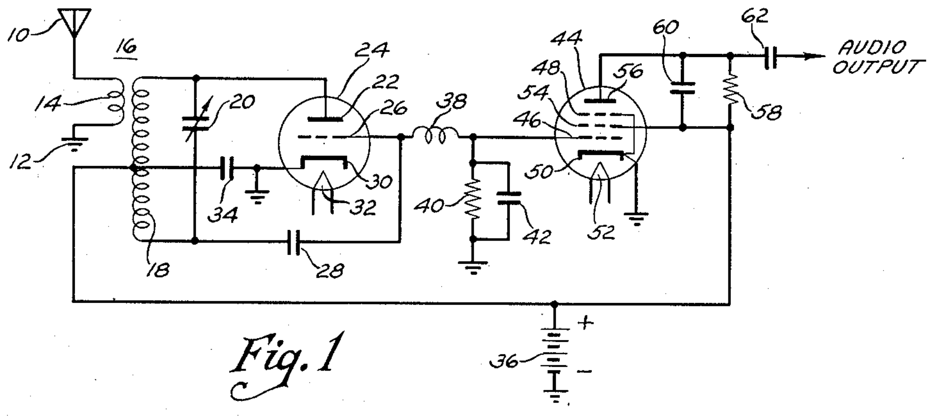
Figure 1 is a schematic diagram of a receiving apparatus incorporating the invention.

Referring now to Figure 1 of the drawings, there is seen a receiver having an antenna 10 connected to ground 12 through the primary winding 14 of the antenna coupling transformer 16 having the tapped secondary winding 18. Winding 18 is shunted by the tuning capacitor 20 and one end thereof is connected to the anode 22 of the vacuum tube amplifier 24, the other end being connected to the control grid 26 of tube 24 through the capacitor 28. The cathode 30 associated with the heater 32 provides the electron emission required for the operation of the tube 24 and is connected to the tap on winding 18 through the capacitor 34. The cathode end of capacitor 34 is also connected to ground. Direct current excitation for the operation of the tube 24 is provided by the direct current source 36 whose positive terminal is connected to the tap on winding 18 and whose negative terminal is connected to ground and thus to the cathode 30.

Control grid 26 is connected to ground through the radio frequency choke 38 in series with the resistor 40 shunted by the capacitor 42, the combination comprising an oscillator of the self-blocking or self-quenching type. A second tube 44, which may serve as a detector and amplifier, has a control grid 46 connected to the ungrounded terminal of the resistor 40. The tube 44 may be of the pentode type having a suppressor grid 48 connected internally to an emissive cathode 50 associated with the heater 52. A screen or space-charge grid 54 is located intermediate of grids 46 and 48 and may be energized by direct connection to the positive terminal of source 36, while the anode 56 is connected to the said positive terminal through a load resistor 58 shunted by a capacitor 60. Output voltages appearing between anode 56 and ground may be led out to any desired work circuit through the blocking capacitor 62.

As earlier intimated, the tube 24 is connected to the tuned circuit 18, 20 in such a manner as to generate oscillations therein. These oscillation voltages drive the grid 26 into the positive region, producing a flow of current thereto through resistor 40. When oscillations start, the voltage across resistor 40 has a negative sign and decreasing amplitude. Once started, the oscillations build up in amplitude in the usual exponential manner until grid 26 begins to draw current, at which time the oscillation amplitude becomes more nearly constant and the flow of current through resistor 40 and choke 38 is initiated. This current charges capacitor 42, making its ungrounded end increasingly negative, until the bias placed on grid 26 is such that the tube can no longer sustain oscillations, at which time they cease. Capacitor 42 now discharges through resistor 40 until the negative bias on control grid 26 is reduced to the point again initiating oscillations, whereupon the process is repeated. The oscillations do not begin and stop at the same grid bias because of the non-linear characteristics of the vacuum tubes employed.

Figure 2:
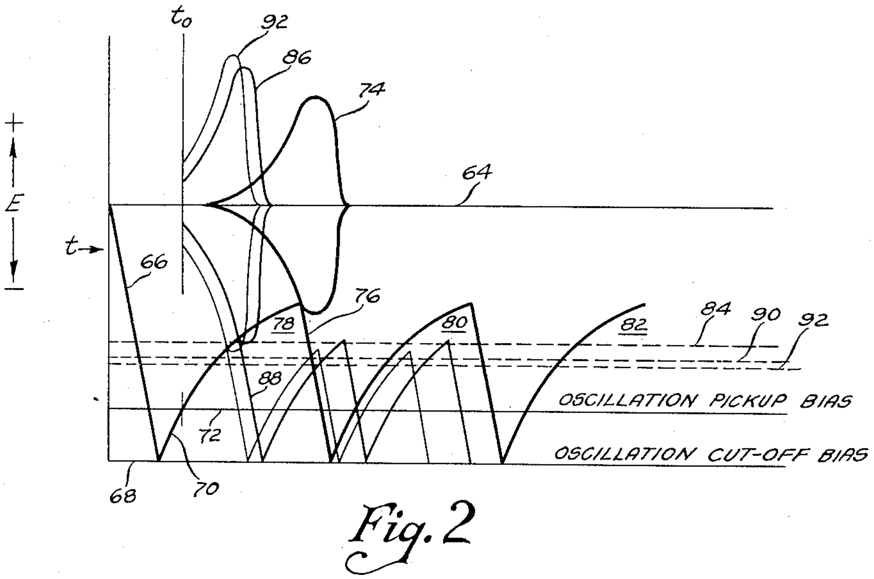
Figure 2 is a graphic portrayal of the voltage wave forms appearing at various points in said circuit.

The voltages appearing at the various parts of the circuit during the occurrence of the above mentioned phenomena are shown in Figure 2, in which 64 is the zero reference line. Curves are shown for the voltages present both with and without signal impressed on the circuit 18, 20, and for convenience all are plotted from the same origin. The downward stroke 66 illustrates the increase in grid bias occurring due to grid current flow during an oscillation cycle not shown, but assumed identical with succeeding cycles of operation for each of the considered conditions. The grid bias increase ceases when the voltage 66 reaches the line 68 drawn at the voltage level where oscillations are cut off and then decreases exponentially along the curve 70 because of the discharge of capacitor 42 through resistor 40. At the point where the curve 70 crosses the voltage level 72, the net loss in the circuit 18, 20, 24 becomes negative and the build-up of oscillatory energy in the circuit commences. Initially, the voltages appearing for the no-signal condition will be examined: In this case, only voltages due to thermal agitation exist in the circuit as the grid voltage shown by curve 70 moves positively of the oscillator pick-up voltage 72, and the oscillations build up effectively from zero level as shown by the oscillation envelope 74, which is the envelope of the oscillation voltage appearing across the circuit 18, 20. When envelope 74 intersects the curve 70, grid current begins to flows, causing the grid bias to follow the curved line 76 to its intersection with the line 68. At this point oscillations cease, and decay of the grid bias sets in as capacitor 42 discharges through the resistor 40, after which the above cycles of operation repeat themselves in continuous sequence. The resulting quench voltage wave appearing across the resistor 40 is that depicted by the impulses 78, 80 and 82 in Figure 2 and the direct current component of this wave is indicated by the dashed line 84 in this figure.

If, now, an input signal be assumed, the envelope of the oscillatory voltages appearing in the resonant circuit 18, 20 is that designated 86, and it will be noted that this curve intersects the grid bias curve 70 at a point earlier in time than the envelope 74, with the result that the oscillator grid bias is driven negatively to the oscillator cut-off level 68 along the line 88 a shorter time after the initiation of the oscillatory condition than when no signal is present. Consequently, the quench voltage wave does not move as far positively as in the no signal condition while its base level is constant, and the direct current component is displaced to the level shown by the dashed line 90. In addition, the rate of repetition is increased. The introduction of a signal has increased the average negative bias across the resistor 40, which of course also increases the average negative bias on the control grid 46 of the tube 44 and decreases the anode current flowing through this tube, to produce a change in voltage drop across the anode load resistor 58.

Further increase in input signal to a value twice that resulting in the envelope 86 gives rise to the oscillation envelope 92, intersecting the grid bias decay curve 70 still earlier to produce a quench wave of still smaller amplitude and higher frequency than in the preceding case, and the direct current component of this wave is shown by the dashed line 92. It may be observed from Figure 2 that, although equal signal increments have been applied, yet the changes in the direct current component of the quench wave are not equal, giving rise to unequal changes in voltage appearing across the anode load resistor 58. The change in direct current component is logarithmic in nature, giving rise to the automatic volume control action characteristic of self-quenched superregenerative receivers.

The quench voltage curves of Figure 2 show that as the amplitude of the input signal increases, the anode current flowing through the tube 44 decreases, the total anode current increment being logarithmically related to the signal input. The quench voltage waves appearing in the lower half of Figure 2 include all voltages which need be considered in determining the magnitude of the anode current change in tube 44 in view of the fact that the presence of the signal frequency choke 38 prevents the signal frequency voltages within the envelopes 74, 86 and 92 from appearing at the grid 46 of tube 44 and influencing the flow of anode current therethrough.

Figure 3:
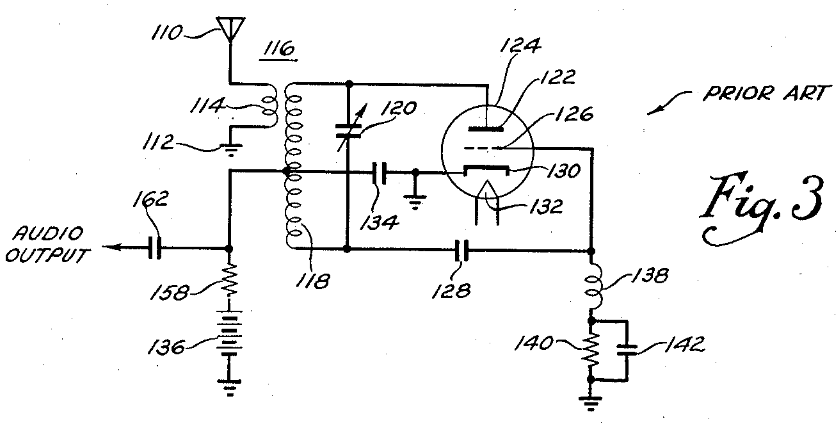
Figure 3 is a schematic diagram of a conventional superregenerative receiver used for the purpose of performance comparison.

A conventional superregenerative receiver circuit is presented in Figure 3, which is quite similar to Figure 1, save that the modulation frequency energy is derived directly from the anode circuit of the superregenerative amplifier, rather than from the anode circuit of an auxiliary tube. For the sake of completeness, however, the complete detail of circuit connections in Figure 3 will be recited. The antenna 110 is connected to the ground 112 through the primary 114 coupled to the secondary 118 of the antenna coupling transformer 116. Secondary 118 is provided with a center tap and may be tuned to the signal frequency by the variable capacitor 120 connected across the end terminals thereof. A tube 124 has its anode 122 connected to one end terminal of coil 118 and its control grid 126 connected to the other coil end terminal through the coupling capacitor 128. The grid current path to ground is completed by the connection of choke 138 to control grid 126 at one end and to the grounded parallel connected resistor 140 and capacitor 142 at the other end. Electron emission for the operation of the amplifying tube 124 is provided by the emissive cathode 130 thermally associated with the heater 132 which may be energized by connection to any suitable source of electrical energy. Cathode 130 is connected to the center tap of coil 118 by capacitor 134 and is also connected to ground. Anode circuit excitation for the operation of the circuit is supplied by the connection of a load resistor 158 to the positive terminal of the direct current source 136 and the connection of the negative terminal of the said source to ground. Changes in the signal intensity at antenna 110 due to modulation alter the current flowing through resistor 158 to provide alternating voltage components which may be transferred to any desired work circuit through coupling capacitor 162 having one terminal connected to the anode end of resistor 158.

The operation of this circuit is quite similar to the operation of the circuit of Figure 1, once again involving the building up of oscillatory voltages which rise to an amplitude causing the flow of grid current, which grid current produces a bias voltage drop across a resistor-capacitor circuit 140, 142 interrupting the oscillations, after which the bias voltage drops to a level once more instituting the oscillatory state. Changes in the impressed signal amplitude control the wave form of the quench voltage appearing across resistor 140 in the same manner as shown in Figure 2, and the change in the average direct current value of the quench wave impressed on the control grid 126 in turn varies the current through resistor 158 in accordance with the signal modulations. The demodulated energy is available from the free terminal of capacitor 162.

However, it is important to note that the quench wave of Figure 2 is not the only voltage appearing on grid 126 in the circuit of Figure 3, as the radio frequency voltages in the circuit 118, 120, whose envelopes for various signal levels are again designated as 74, 86, 92 in Figure 2, are also present. Such a marked improvement in the sensitivity of the circuit of Figure 1 over the conventional circuit of Figure 3 has been observed, that the effect of the presence of radio frequency voltages on the grid 126 has been carefully examined to determine whether the improved performance is in some way connected with the exclusion of such voltages from the grid 46 in the tube 44 of Figure 1. As a result of this analysis, which is outlined below, it has been found that the presence of radio frequency voltage on the grid 126 of the tube 124 in Figure 3 produces a plate current increment with change in signal strength which opposes the increment produced by the change in quench voltage wave form, the latter increment predominating. Consequently, the signal voltage appearing across resistor 158 is the result of the difference of these two increments and has a relatively small magnitude in the conventional circuit of Figure 3, while in the circuit of Figure 1, only the quench wave form changes affect the anode current through resistor 58 since the radio frequency voltages are excluded from the control grid 46 by the action of choke 38 and the capacitor 42. The signal-produced voltages at the output of the circuit in Figure 1 are therefore larger than those delivered at the output of the circuit of Figure 3, have a better signal-to-noise ratio, and a better signal-to-quench-frequency-energy ratio. The new arrangement provides better operating characteristics than can be secured by the simple provision of an amplifier to amplify the output derived at output capacitor 162 of Figure 3.

From the diagram of Figure 2, it is clear that the change in the quench wave form with increasing signal amplitude is of a nature which will decrease the current flowing in the anode circuit of the tube 124. Because of the non-linear action of the thermionic vacuum tube, the radio frequency voltages having the envelopes 74, 86 and 92 in Figure 2 cause a positive change of anode current but, due to the fact that the length of the enclosed area decreases as its amplitude increases with greater applied signal, it is not at once apparent how this second anode current component is related to the signal input. It must be determined whether a positive increment in signal causes a positive or negative increment in the second current component. If the former, the effect of variations in the second component will oppose the variations in the quench wave controlled component reducing the signal output, while, if the latter, the effect of variations in the second anode current component will reinforce the variations in the quench wave controlled component increasing the signal output.

In the development of the analysis, time will be reckoned from the $t_0$ line in Figure 2, the positive half of the signal frequency envelopes will be considered as expressed by $Ae^{at}$, where A is the signal amplitude at time $t_0$ and $a$ is an exponent determined by the circuit constants; and the equation of the curve 70 will be taken as $-E_{72}e^{-bt}$, where $E_{72}$ is the oscillation pickup bias and $b$ is an exponent controlled by resistor 140 and capacitor 142. Practical values for $a$ and $b$ are $10^5$ and $3\times10^4$, respectively, and $E_{72}$ may be 20 volts. The time when the signal frequency envelope intersects the curve 70 is taken as $t_1$ and, considering the time of blocking small as compared with $t_1$, the quench frequency may be taken as $$\frac{1}{t_1}=f$$

$t_1$ is determined from the conditions defining it:

$$Ae^{at_1}=E_{72}e^{-bt_1}$$

$$1nA+at_1 1ne=1nE_{72}-bt_1 1ne$$

$$t_1=\frac{1}{a+b}1n\frac{E_{72}}{A}=\frac{10^{-5}}{1.3}1n\frac{E_{72}}{A}$$

The quantity of electricity passed in the anode circuit during a cycle of operation due to anode circuit rectification of the oscillation envelope is approximately:

$$Q=A\int_{t_0}^{t_1}e^{at}dt=\frac{A}{a}e^{at_1}=A\times10^{-5}e^{\frac{1}{1.3}\ln\frac{E_{72}}{A}}$$

$$Q=A\left(\frac{E_{72}}{A}\right)^{\frac{1}{1.3}}\times10^{-5}=A^{\frac{0.3}{1.3}}\times10^{-4}(E_{72}=20)$$

This shows that the quantity of electricity passed in the anode circuit per cycle of operation increases positively with a positive increment in signal. The anode current increment is the total quantity per unit time, and is therefore $Qf$. Since both Q and $f$ increase with increase in input signal, the anode current increment induced by the signal frequency voltage is positive and opposes the changes in anode current caused by the signal controlled variations in the quench voltage wave form. It is the elimination of this opposing rectification effect which is believed responsible for the considerable increase in sensitivity and output voltage obtainable in the circuit of Figure 1 as compared with the conventional circuit of Figure 3.

Figure 4:
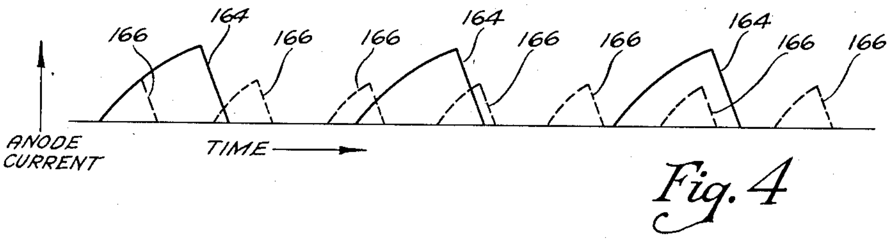
Figure 4 is a graphic showing of currents appearing in the output circuit of the apparatus of Figures 1 and 5.

In addition to the above outlined increase in demodulated signal output, the circuit of Figure 1 provides still another improvement in the output signal delivered to the work circuit over the circuit of Figure 3. In Figure 2 it may be seen that changes in the intensity of the input signal elevate and depress the positive tips of the quench wave form to provide the change in direct current component. The negative portions of the quench wave all rest on the base line determined by the oscillation cut-off bias voltage 68 and are unaffected by changes in the signal strength. The excursions of the positive quench wave tips contain all the data necessary for the derivation of the signal intelligence, but they never reach a negative value corresponding to the oscillation pick-up bias. Yet variation of the control grid voltage on tube 124 within the intermediate region between the oscillation pick-up bias and the minimum positive tip value produces pulses of anode current at the quench frequency making for a quite unfavorable ratio of signal energy to quench frequency energy. By proper selection of the tube 44 in Figure 1 or the application of suitable bias thereto, an operating characteristic may be provided in which anode current pulses flow between anode 56 and cathode 50 only while the quench voltage wave has a value in the region encompassing the excursions produced by signal variations, no current flowing while the quench wave is more negative than this. The resulting anode current wave forms for two signal levels are shown in Figure 4, the pulses 164 illustrating the current flowing with no signal, while the pulses 166 illustrate the response obtained in the presence of a signal of arbitrary level. Obviously the direct current component of these waves decreases with increase in signal strength. Now there is no response to the portions of the quench voltage wave which are not affected by the incoming signal, so that the amount of quench frequency energy appearing in the anode circuit of tube 44 is only that absolutely necessary for conveying the signal intelligence. The ratio of signal frequency energy to quench frequency energy is, as a result, much more favorable than that which appears in the anode circuit of tube 124 in Figure 3, making the elimination of the quench energy a relatively simple task in the event that a still further improvement in the ratio is desired.

Figure 5:
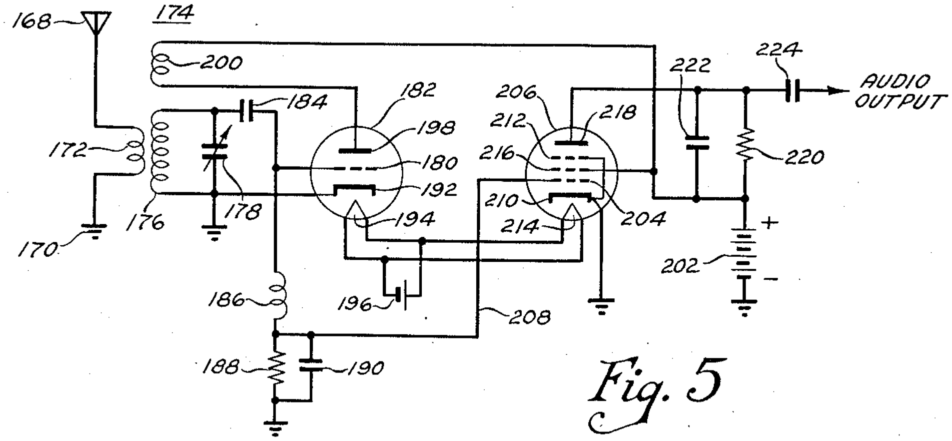
Figure 5 is a schematic diagram of an alternative arrangement for receiving apparatus in which the feedback takes place from a separate winding inserted in the anode circuit of the superregenerative amplifier.

The advantages of the invention may be realized in conjunction with any of the well known self-quenched superregenerative receiver circuits, in all of which the demodulated output is the resultant of two opposing actions. One of the alternative circuits is shown in Figure 5, in which the antenna 168 is connected to the ground 170 through the primary winding 172 of the antenna coupling and feedback transformer 174. A secondary winding 176 is coupled to primary 172 and may be tuned to resonance with the selected signal by the variable capacitor 178 connected thereacross. One terminal of winding 176 is grounded and the other may be connected to the control grid 180 of the amplifier tube 182 through the coupling capacitor 184. The direct current path from the control grid 180 to ground is completed by the connection of the signal frequency choke 186 to the control grid 180 at one end, and at the other end to the parallel connected grid leak resistor 188 and grid condenser 190. The electron emission for the operation of the amplifier 182 is provided by the cathode 192 associated with the heater 194 connected across the heater source 196. The cathode 192 is also connected to ground. The anode 198 of tube 182 is connected to the positive terminal of source 202 through the feedback winding 200 poled to cause the generation of oscillations in the transformer 174 by the action of tube 182.

As in the previously described circuits, there is developed across resistor 188 a quench voltage wave whose amplitude and frequency are controlled by the incoming signal, and this voltage is impressed on the control grid 204 of the amplifier tube 206 by the connecting lead 208. The tube 206 is provided with a cathode 210 connected internally to the suppressor grid 212 as well as to ground, this cathode being brought to operating temperature by the adjacent heater 214 connected across the heater source 196. The space charge grid 216 of tube 206 is connected to the positive terminal of the direct current source 202, and the anode 218 is energized from the same point through the anode load resistor 220 which may be shunted by capacitor 222 to minimize the quench frequency voltage across resistor 220. The direct current circuits to the source 202 are completed by the connection of the negative terminal thereof to ground. Voltages appearing across resistor 220 may be impressed on any desired work circuit through the output coupling capacitor 224 having one terminal connected to the anode 218.

The operation of the circuit of Figure 5 is the same as that described in conjunction with Figure 1, the difference in the two circuits residing in the configuration employed for reimpressing energy from the anode circuit of tube 182 on the input circuit thereof. The voltage wave forms of Figure 2 also appear in the circuit of Figure 5 and tube 206 operates in the same manner as previously described in connection with Figure 1. Here, signal frequency voltages are eliminated from the control grid 204 by the combined action of capacitor 190 and choke 186. It is thus clear that the separate detector amplifier tube may be advantageously employed in any receiver in which the received signal controls a quench voltage wave, providing means are present to impress the quench voltage on the control grid of the separate tube which at the same time eliminate any radio frequency voltage.

It will be obvious that many changes and modifications may be made in the invention without departing from the spirit thereof as expressed in the foregoing description and in the appended claims.

I claim:

1. In signal responsive apparatus, a circuit resonant to a predetermined frequency, means for impressing a modulated signal at substantially said predetermined frequency on said circuit, an electric discharge device having a cathode, a control grid and an anode, a capacitor connecting said control grid with a first point on said circuit, means connecting said anode and said cathode with said circuit in oscillating relationship, a first impedance having high impedance to currents at said predetermined frequency and low impedance to currents of modulation frequency, a second impedance having low impedance to currents at said predetermined frequency, and high impedance to currents at said modulation frequency, means connecting one terminal of said first impedance to said control grid, means connecting said second impedance between the other terminal of said first impedance and a point on said circuit other than said first point, and polarity-sensitive detecting means connected across said second impedance and so poled as to be responsive to positive excursions of the potential at the said other terminal of said first impedance and non-responsive to negative excursions thereof.

2. In signal responsive apparatus, a circuit resonant to a predetermined frequency, means for impressing signal energy on said circuit, an amplifier having input and output circuits, means connecting said input and output circuits to said resonant circuit in positive feedback relationship, a direct current source of electrical energy energizing said output circuit, an inductance, means connecting one terminal of said inductance to one side of said input circuit, a parallel connected resistor and capacitor connected between the other terminal of said inductance and the negative terminal of said direct current source, and rectifying means responsive to the voltages appearing across said parallel connected resistor and capacitor.

3. In signal responsive apparatus, a circuit resonant to a predetermined frequency, means for impressing signal energy on said circuit, an electric discharge device having input and output circuits, means connecting said input and output circuits to said resonant circuit in positive feedback relationship, a direct current source of electrical energy energizing said output circuit, an inductance, means connecting one terminal of said inductance to one side of said input circuit, a parallel connected resistor and capacitor connected directly between the other terminal of said inductance and the negative terminal of said direct current source, a second electric discharge device having a cathode, a control grid and an anode, means connecting said second cathode to the negative terminal of said direct current source, means connecting said second control grid to said other inductance terminal, and a load impedance connected between the positive terminal of said source and said second anode.

4. In signal responsive apparatus, a circuit resonant to a predetermined frequency, means for impressing signal energy on said circuit, an electric discharge device having input and output circuits, means connecting said input and output circuits to said resonant circuit in positive feedback relationship, a direct current source of electrical energy energizing said output circuit, an inductance, means connecting one terminal of said inductance to one side of said input circuit, a parallel connected resistor and capacitor connected directly between the other terminal of said inductance and the negative terminal of said direct current source whereby oscillations in said resonant circuit are periodically interrupted by quench frequency voltage developed across said parallel connected resistor and capacitor, and polarity sensitive detecting means connected between said other terminals of said inductance and said cathode and so poled as to be responsive to positive excursions of the potential of said other terminal and non-responsive to negative excursions thereof.

5. In signal responsive apparatus, a circuit resonant to a predetermined frequency, means for impressing signal energy on said circuit, an electric discharge device having a cathode, a control grid and an anode, means operatively connecting said cathode to an intermediate point of said resonant circuit, means connecting said anode to an end terminal of said resonant circuit, a capacitor connecting said control grid to the other end terminal of said resonant circuit, a source of direct current having positive and negative terminals, means connecting said cathode to said negative terminal, means connecting said resonant circuit to said positive terminal, an inductance having one terminal connected to said control grid, a parallel connected resistor and capacitor connected between the other terminal of said inductance and said cathode, a second electric discharge device having a cathode, a control grid, and an anode, means connecting said second cathode to said negative source terminal, means connecting said second control grid to said other terminal of said inductance, a resistor connecting said second anode to said positive source terminal, and a capacitor shunting said resistor.

6. In signal responsive apparatus, a circuit resonant to a predetermined frequency, means for impressing signal energy on said circuit, an electric discharge device having a cathode, a control grid and an anode, a capacitor connecting said control grid with one end of said resonant circuit, means connecting said cathode with the other end of said resonant circuit, a source of direct current having positive and negative terminals, coupling means reacting with oscillation producing polarity on said resonant circuit connected between said anode and said positive source terminal, means connecting said negative source terminal with said cathode, an inductance having one terminal connected to said control grid, a parallel connected resistor and capacitor connected between the other inductance terminal and said negative source terminal, and polarity sensitive detecting means connected between said other terminal of said inductance and said cathode and so poled as to be responsive to positive excursions of the potential of said other terminal and non-responsive to negative excursions thereof.

7. In signal responsive apparatus, a circuit resonant to a predetermined frequency, means for impressing signal energy substantially at said predetermined frequency on said resonant circuit, an electric discharge device having a cathode, a control grid, and an anode, means connecting said cathode, control grid, and anode to said circuit in positive feed-back relationship, means for deriving from the grid current of said discharge device a voltage responsive to signal variations, a second electric discharge device having a cathode, a control grid and an anode, means for impressing said voltage including a direct current component controlled thereby on said control grid of said second discharge device, and means for excluding energy at said predetermined frequency from said control grid of said second discharge device.

8. In signal responsive apparatus, a circuit resonant to a predetermined frequency, means for impressing signal energy substantially at said predetermined frequency on said resonant circuit, an electric discharge device having a cathode, a control grid and an anode, means connecting said cathode, control grid, and anode to said circuit in positive feed-back relationship, a resistor traversed by the grid current of said discharge device, a second electric discharge device having a cathode, a control grid and an anode, means for impressing voltages appearing across said resistor including a direct current component controlled thereby on said control grid of said second discharge device, and means for excluding energy at said predetermined frequency from said control grid of said second discharge device.

9. In signal responsive apparatus, a circuit resonant to a predetermined frequency, means for impressing signal energy substantially at said predetermined frequency on said resonant circuit, an electric discharge device having a cathode, a control grid and an anode, means connecting said cathode, control grid, and anode to said circuit in positive feed-back relationship, a resistor traversed by the grid current of said discharge device, a second electric discharge device having a cathode, a control grid and an anode, means connecting said second cathode to one terminal of said resistor, means galvanically connecting said second control grid to the other terminal of said resistor, and means for excluding energy at said predetermined frequency from the control grid circuit of said second discharge device.

10. In signal responsive apparatus: a circuit resonant to a predetermined frequency; means for impressing a modulated signal substantially at said predetermined frequency on said circuit; means including a first electric discharge device for periodically varying the energy loss in said circuit positively and negatively of zero at a second frequency; means including a second electric discharge device for deriving from said circuit voltages at all frequencies equal to and less than said second frequency and including direct current components; and means excluding energy at said predetermined frequency from said voltage deriving means.

RICHARD CARLISLE EMERSON.

REFERENCES CITED

The following references are of record in the file of this patent:

UNITED STATES PATENTS

| Number | Name | Date |
|---|---|---|
| 2,134,801 | Reinartz | Nov. 1, 1938 |
| 2,135,672 | Morris et al. | Nov. 8, 1938 |
| 2,147,595 | Hilferty | Feb. 14, 1939 |
| 2,171,148 | Percival | Aug. 29, 1939 |
| 2,226,657 | Bly | Dec. 31, 1940 |
| 2,351,221 | Mountjoy | June 13, 1944 |